(12) United States Patent
Deshpande

(10) Patent No.: US 7,562,172 B2
(45) Date of Patent: Jul. 14, 2009

(54) I2C SLAVE/MASTER INTERFACE ENHANCEMENT USING STATE MACHINES

(75) Inventor: Amrita Deshpande, Chandler, AZ (US)

(73) Assignee: NXP B.V., Eindhoven (NL)

( * ) Notice: Subject to any disclaimer, the term of this patent is extended or adjusted under 35 U.S.C. 154(b) by 105 days.

(21) Appl. No.: 11/913,067

(22) PCT Filed: May 1, 2006

(86) PCT No.: PCT/IB2006/051365

§ 371 (c)(1),
(2), (4) Date: Oct. 29, 2007

(87) PCT Pub. No.: WO2006/117752

PCT Pub. Date: Nov. 9, 2006

(65) Prior Publication Data

US 2008/0195783 A1    Aug. 14, 2008

Related U.S. Application Data

(60) Provisional application No. 60/676,095, filed on Apr. 29, 2005.

(51) Int. Cl.
 *G06F 13/18* (2006.01)
(52) U.S. Cl. ..................... 710/110; 710/105
(58) Field of Classification Search .................. 710/110
 See application file for complete search history.

(56) References Cited

U.S. PATENT DOCUMENTS

| | | | |
|---|---|---|---|
| 6,799,233 | B1 | 9/2004 | Deshpande et al. |
| 2005/0228915 | A1* | 10/2005 | Saripalli et al. ............. 710/110 |
| 2006/0095670 | A1* | 5/2006 | Behrendt et al. ............ 711/118 |

OTHER PUBLICATIONS

The I2C-Bus Specification Version 2.1; Philips Semiconductor; Jan. 2000.*
Deshpande, Amrita "Design of a Behavioral (Register Transfer Level, RTL) Model of the Inter-Integrated Circuit or I2C-Bus Master-Slave Interface" Master's Thesis of Amrita Desphande, University of New Mexico, 1999.
"CoolRunner CPLD I2C Bus Controller Implementation" Dec. 30, 2003, XILINX URL-WWW.XILINX.COM/BVDOCS/APPNOTES/XAPP333.PDF.

* cited by examiner

*Primary Examiner*—Glenn A Auve

(57) ABSTRACT

Consistent with one example embodiment, communications systems, using a serial data transfer bus having a serial data line and a clock line used to implement a communications protocol, incorporate enhanced slave/master interfacing on an I2C bus using state machines. The communications system includes a first and second state-machine responsive to the rising edge of the clock signal, and a third state-machine, distinctly operational from the first and second state-machine, responsive to the falling edge of the clock signal. One of the first state-machine and the second state-machine conform to write states of the communications protocol, and the other of the first state-machine and the second state-machine conform to read states of the communications protocol.

20 Claims, 8 Drawing Sheets

I2C SLAVE/MASTER INTERFACE ENHANCEMENT USING STATE MACHINES

The present invention is directed generally to communication devices and methodologies, and more particularly, to methods and arrangements for enhancing slave/master interfacing on an I2C bus using state machines.

The Inter-Integrated Circuit (I2C) bus developed by Philips Corporation allows integrated circuits to communicate directly with each other via a simple bidirectional 2-wire bus (plus power and ground). A device connects to each of the two wires on the bus, one serial data line (SDA) for the communication of data, and the other serial clock line (SCL) for the control and synchronization of the communication of data between the devices. Each device is connected in parallel to each of the other devices, and each of the bus lines, SDA and SCL, function as a wired-AND of all the lines on the bus. The output of each device is configured as an open-collector/open-drain device, and one or more pull-up resistors maintain a 'soft' logic high value on the bus while the bus is in the quiescent state. When a device desires access to the bus, the device pulls the bus to a logic low value, via the open-collector/open-drain device that is placed in a conductive state to ground potential.

Each device that is connected to an I2C bus is identifiable by an address, and can operate as either a transmitter or a receiver, or both. Data transfers are effected using a master-slave communications protocol. A master is a device that initiates a data transfer and generates the clock signals to permit the transfer; any device that is addressed is considered a slave for this transfer. The data transfer can be initiated by a master to either transmit data to the slave (herein designated as write), or to request data from the slave (herein designated as read). For example, an output device, such as a display screen, is typically not able to initiate a data transfer, and therefore would be configured to only operate as a slave device. A microprocessor, on the other hand, will typically be configured to operate as either a master or a slave, as the situation demands.

In a quiescent state, both the SDA and SCL bus lines are in the logic-high state (herein designated as high, or logic state of 1). A master initiates a data transfer by asserting a transition to a logic-low state (herein designated as low, or logic state of 0) on the SDA line while the SCL line is high; this is termed a START condition. Thereafter, the master toggles the SCL line to control the synchronization of the data transfer; data value changes occur on the SDA line when the SCL clock is low, and the state of the SDA line is considered valid only when the SCL clock is high.

Multiple STARTs can be asserted to effect a series of data transfers within the same transfer session. Generally, each data transfer requires an acknowledgement from the addressed recipient of the data transfer. To terminate the data transfer, the host asserts a low-to-high transition on the SDA line while the SCL clock is high; this is termed a STOP condition. Thereafter, any device may assume control of the bus as a master by asserting a high-to-low transition on the SDA line, as above. Note that, for ease of reference, the term assert is used herein for effecting, or attempting to effect, the specified logic state. In the example of a transition to a logic-high state, this is typically provided by a release of the bus from a forced pull-down state by the asserting device. This assertion of a logic-high state allows the aforementioned pull-up devices on the bus to bring the bus to a logic-high state, unless another device is also forcing the pull-down state.

The general format of an I2C data transfer involves signals on an SDA line and an SCL line forming the I2C bus. A START condition (S) corresponds to high-to-low transition of the signal on the SDA line while the SCL line is high. After the START, the host transmits an address, nominally seven bits, followed by a read/write-not indicator. After transmitting the address and the direction of data transfer (R/W-), the host releases the SDA line, allowing it to rise to a logic-high level. If a slave device recognizes its address, the slave device transmits an acknowledge signal (ACK) by pulling the bus low. The absence of a low signal when the host releases the SDA line, therefore, indicates a non-acknowledgement (NAK). If the address is acknowledged, via a low at SDA, the transmitting device transmits the data. If the direction of data transfer is a "read" relative to the host, then the slave device is the transmitting device; if the direction is a "write" relative to the host, then the master device is the transmitting device. The transmitting device releases control of the SDA line, and the receiving device acknowledges the receipt of the data by asserting a logic-low value on the SDA line. If the data is acknowledged, the transmitter sends additional data. This process continues until the entirety of the data is communicated, or until a transmitted data item is not-acknowledged. The master can subsequently reassert a START signal, and repeat the process above, or, can assert a STOP signal (P) to terminate this data-transfer session.

The above interface protocol can be implemented in a variety of ways. To minimize the development time for programming or designing an I2C interface, a variety of general-purpose interface schemes have been published. "Design Of A Behavioral (Register Transfer Level, RTL) Model Of The Inter-Integrated Circuit Or I2C-Bus Master-Slave Interface", Master's Thesis of Amrita Deshpande, University of New Mexico, 1999, discloses an I2C master interface and slave interface that is intended to be embodied in an I2C device, and is incorporated by reference herein. By providing a verified I2C interface, system designers need not address the details of the I2C specification and protocol. Both the master and the slave interfaces of this thesis are state-machine based. State-machine based systems and methods are further described in U.S. Pat. No. 6,799,233, which is hereby incorporated herein by reference.

Various aspects of the present invention are directed to methods and arrangements for I2C interface enhancement using state-machines in a manner that addresses and overcomes the above-mentioned issues.

Consistent with one example embodiment, the present invention is directed to a communications system and/or method that uses an I2C serial data transfer bus that has a serial data line and a clock line used to implement a communications protocol. The communications system includes a first and second state-machine responsive to the rising edge of the clock signal, and a third state-machine, distinctly operational from the first and second state-machine, responsive to the falling edge of the clock signal. One of the first state-machine and the second state-machine conform to write states of the communications protocol, and the other of the first state-machine and the second state-machine conform to read states of the communications protocol.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

The invention may be more completely understood in consideration of the following detailed description of various embodiments of the invention in connection with the accompanying drawings, in which.

Figure 1:
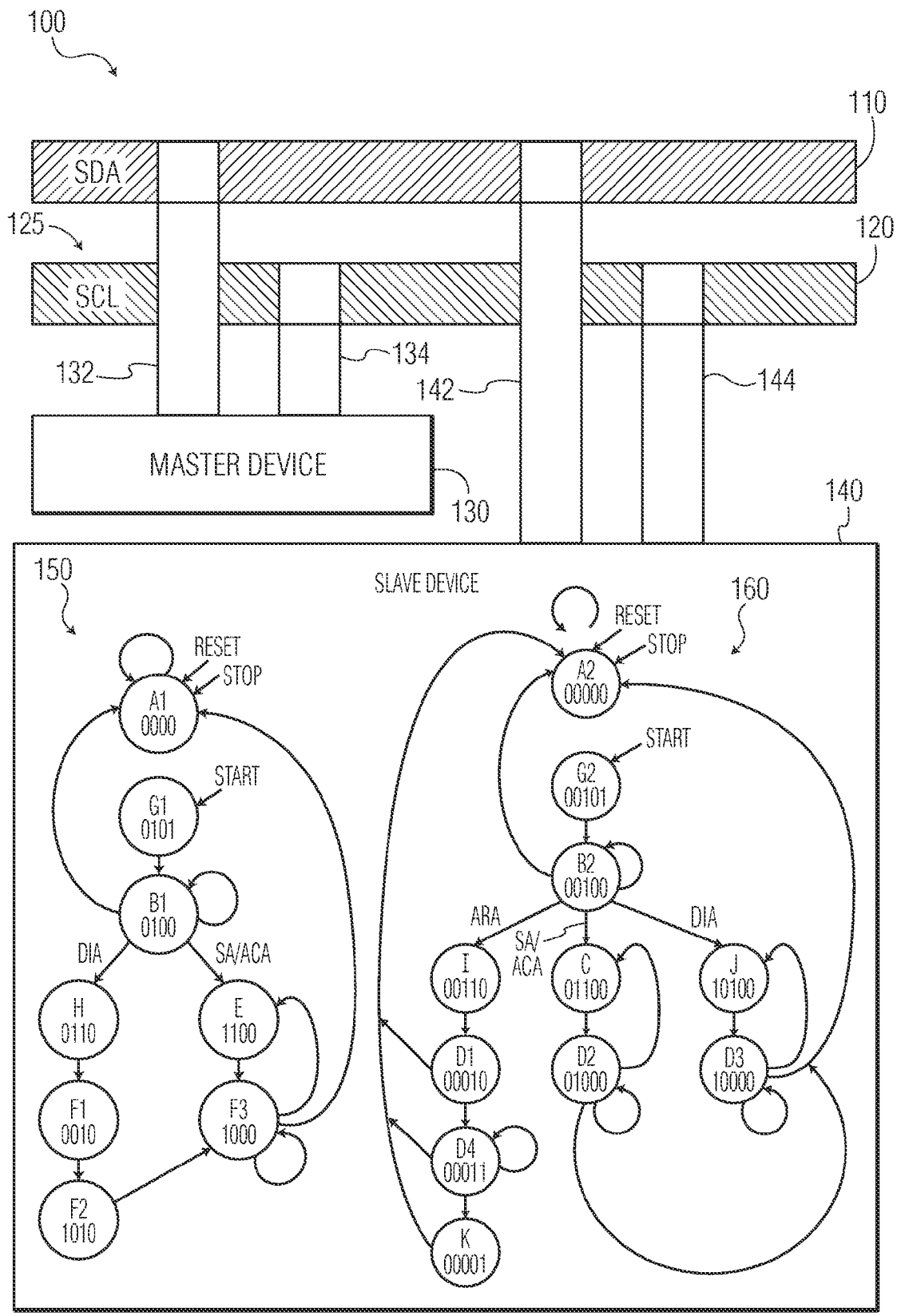
FIG. 1 is a block diagram of a data communications system implementing enhanced slave/master interfacing on an I2C bus using state machines in accordance with embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is generally applicable to methods and arrangements for enhancing slave/master interfacing on an I2C bus using state machines. The invention has been found to be particularly advantageous for Inter Integrated Circuit (I2C) serial data communications busses, but is also advantageous for other busses and communications protocols, such as system management bus (SMBus) architectures and/or protocols or other serial data communications systems. For purposes of illustration, and not of limitation, the invention will be described in the context of an I2C bus having a master device controlling communication to a slave device.

Masters control the communication with I2C slaves on the I2C bus architecture. I2C slaves find numerous applications in fields ranging from cell phones, PDAs and SmartPhones to LCD TVs, Medical Equipment, Gaming, and other applications. New features for devices on I2C data busses present new problems for communications between master and slave devices. The concurrent use of multiple state machines, in accordance with the present invention, may be used to address some of the problems presented by the new features. These state machines streamline the design and generation of control signals for data transfer and eliminate the use of "glue" logic to incorporate the additional features.

In a particular embodiment of the present invention, two state machines run in the foreground of the slave device, running off of the rising edge of the SCL clock, and one state machine runs in the background, running off of the falling edge of the SCL clock. There are two state machines in the foreground, instead of one monolithic state machine, in order to maintain the Gray code for the state machines. Gray coding the state machines eliminates glitches on the data output that is generated based on the states of the state machine.

As stated above, there is one state machine that runs in the background, which runs off of the falling edge of the SCL clock. Running the foreground and the background state machines off of the opposite edges of the clock eliminates race conditions on the inputs of the state machine in the background.

Consistent with one example embodiment, the present invention is directed to a communications system that uses an I2C serial data transfer bus that has a serial data line and a clock line used to implement a communications protocol. The communications system includes a first and second state-machine responsive to the rising edge of the clock signal, and a third state-machine, distinctly operational from the first and second state-machine, responsive to the falling edge of the clock signal. One of the first state-machine and the second state-machine conform to write states of the communications protocol, and the other of the first state-machine and the second state-machine conform to read states of the communications protocol.

FIG. 1 is a block diagram of a data communications system 100 implementing enhanced slave/master interfacing on an I2C bus using state machines in accordance with embodiments of the present invention. An SDA line 110 and an SCL line 120 are arranged as an I2C data bus 125. A master device 130 and a slave device 140 are attached to the I2C data bus 125. The master device 130 is electrically connected to the I2C data bus 125 using a clock connection 134 and a data connection 132 electrically connected to the SCL line 120 and the SDA line 110 respectively.

The slave device 140 is electrically connected to the I2C data bus 125 using a clock connection 144 and a data connection 142 electrically connected to the SCL line 120 and the SDA line 110 respectively. The slave device contains a first state machine 150, and a second state-machine 160, running in the foreground. The first state machine 150 is designated as I2C state machine-WRITE (I2CSM-W), and the second state-machine 160 is designated as I2C state machine-READ (I2CSM-R) for convenience. The two state machines, I2CSM-W and I2CSM-R are the state machines that run in the foreground and which run off of the rising edge of SCL. A background state machine 170 (Illustrated in FIGS. 4 through 7) is designated as DIA_ARA_SM, is the state machine that runs in the background and off of the falling edge of SCL.

The I2CSM-W and I2CSM-R state machines are stimulated by the I2C bus and interpret the communication protocol. The DIA_ARA_SM state machine facilitates the implementation of new features, such as responding to a Device ID Address and an SM Bus Alert Response, which are further described below.

Figure 2:
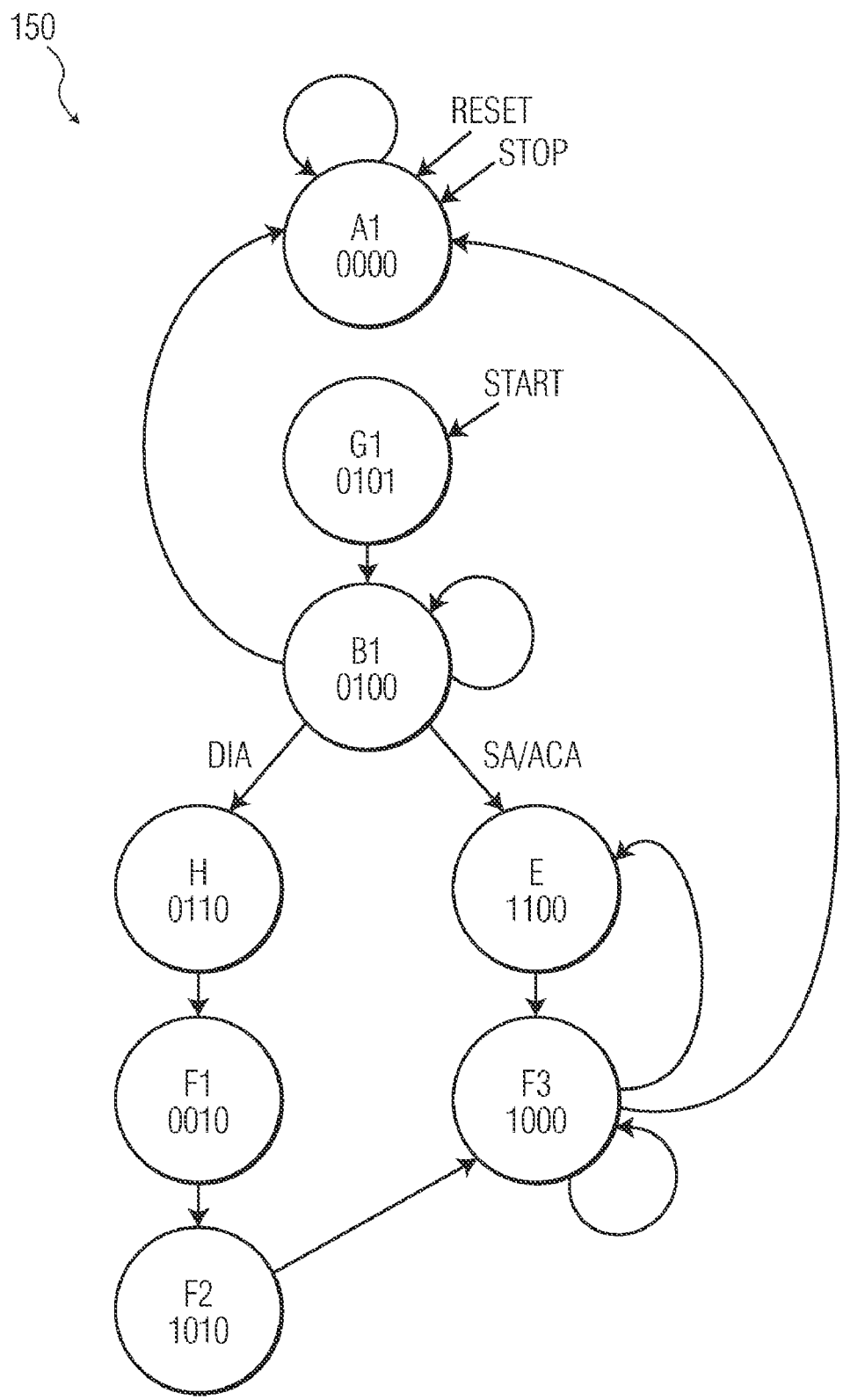
FIG. 2 is state diagram for a data communications system implementing enhanced slave/master interfacing on an I2C bus using state machines in accordance with embodiments of the present invention.

FIG. 2 is a state diagram for the first state machine 150. For purposes of illustration, and not limitation, the state-machine is illustrated as a I2C slave device having connections to a standard I2C bus (e.g. SDA, SCL, Ground (GND), Power (VDD)) and an interrupt pin designated INT#. Each circle in FIG. 2 corresponds to an individual state, and is designated by a capital letter, and corresponds to a 4-bit binary coding illustrated below the capital letter. Following is a description of the states:

State A1:
This state machine resets, asynchronously, on a STOP and a RESET condition, both active HIGH.
It uses a gated SCL clock. The SCL clock is gated with the state of the state machine. The state machine does not receive the SCL when either this "write" state machine or the "read" state machine are in their respective idle states (A1 and A2).

State G1:
Upon a START condition, the state machine enters state G1, asynchronously.

On the next clock the state-machine goes into state B1, in which it is ready to receive the slave address.

State B1:
If the slave busy signal is asserted, the state machine resets back to state A1.
If the state-machine receives the All Call Address (ACA) and if this feature is disabled, then the state machine resets back to state A1.
If the state-machine receives the SMBus Alert Response Address (ARA) and if this feature is disabled, then the state machine resets back to state A1.
If the state-machine receives the Device ID Address (DIA) and if this feature is disabled, then the state machine resets back to state A1.
The following (from this point to State E) assumes that the ACA, ARA and the DIA are enabled:
If the state-machine receives the Slave Address (SA) or the ACA with a Read bit, it resets back to state A1.
If the state-machine receives the Slave Address (SA) or the ACA with a Write bit, it goes to state E.
If the state-machine receives the ARA and a Read bit and if the Interrupt is LOW, then it resets back to state A1.
If the state-machine receives the ARA and a Read bit and if the Interrupt is HIGH, then it resets back to state A1.
If the state-machine receives the ARA and a Write bit and if the Interrupt is LOW, then it resets back to state A1.
If the state-machine receives the ARA and a Write bit and if the Interrupt is HIGH, then it resets back to state A1.
If the state-machine receives the DIA with a Write bit then it goes to state H.
If the state-machine receives the DIA with a Read bit then it resets back to state A1.
If the state-machine receives anything other than the SA or the ACA or the ARA or the DIA, it resets back to state A1.
If the state-machine is none of the above, it stays in state B1, and receives the slave address.

State E:
In this state, the state machine sends out an ACKNOWLEDGE.
The state machine goes to state F3 on the next SCL clock.

State F3:
In state F3, the state machine shifts data in from the serial data line.
If the state machine receives a slave busy signal at the end of shifting the data in, the state-machine returns to state A1, or if the state-machine completes the data shift without receiving a slave busy signal it goes back to state E.
The state-machine stays in state F3 as long as it is shifting eight bits in.

State H:
In this state, the state machine sends out an ACKNOWLEDGE.
The state machine goes to state F1 on the next SCL clock.

State F1:
In this state, the state machine receives the first bit of the DIA.
The state machine goes to state F2 on the next SCL clock.
This state has been added to maintain the Gray code encoding of the state machine.

State F2:
In this state, the state machine receives the second bit of the DIA.
The state machine goes to state F3 on the next SCL clock.
This state has been added to maintain the Gray code encoding of the state machine.

Figure 3:
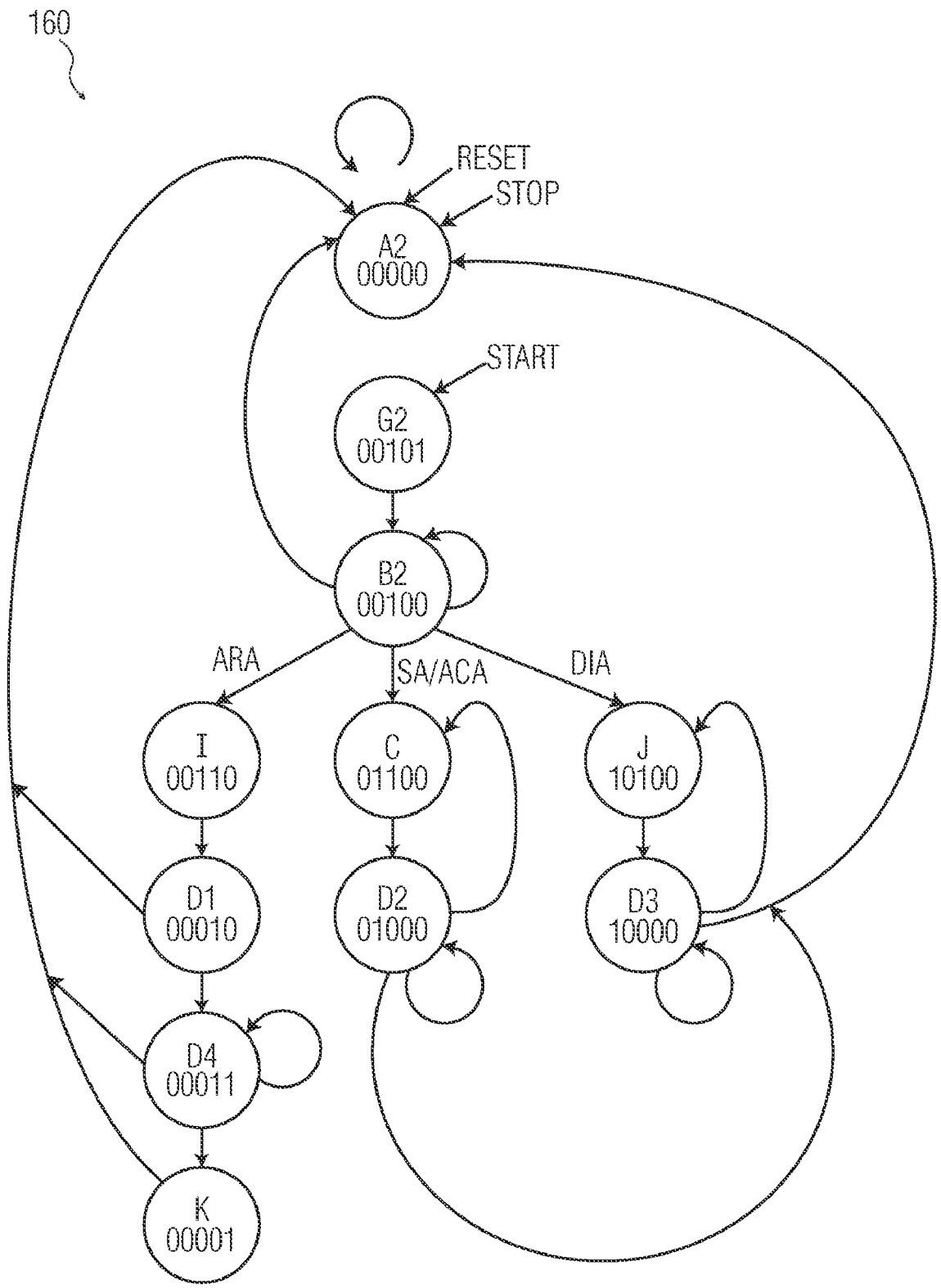
FIG. 3 is another, distinctly operational, state diagram for a data communications system implementing enhanced slave/master interfacing on an I2C bus using state machines in accordance with embodiments of the present invention.

FIG. 3 is a state diagram for the second foreground state-machine 160, in accordance with embodiments of the present invention. The states illustrated in FIG. 3 conform to the same designation protocol as FIG. 2. Following is a description of the states:

State A2:
This state machine resets, asynchronously, on a STOP and a RESET condition, both active HIGH.
It uses a gated SCL clock. The SCL clock is gated with the state of the state machine. The state machine does not receive the SCL when either this "write" state machine or the "read" state machine are in their respective idle states (A1 and A2).

State G2:
Upon a START condition, the state machine enters state G2, asynchronously.
On the next clock the state-machine goes into state B2, in which it is ready to receive the slave address.

State B2:
If the slave busy signal is asserted, the state machine resets back to state A2.
If the state-machine receives the All Call Address (ACA) and if this feature is disabled, then the state machine resets back to state A2.
If the state-machine receives the SMBus Alert Response Address (ARA) and if this feature is disabled, then the state machine resets back to state A2.
If the state-machine receives the Device ID Address (DIA) and if this feature is disabled, then the state machine resets back to state A2.
The following (from this point to State I) assumes that the ACA, ARA and the DIA are enabled.
If the state-machine receives the Slave Address (SA) or the ACA with a Read bit, it goes to state C.
If the state-machine receives the DIA with a Read bit, it goes to state J.
If the state-machine receives the (SA) or the ACA with a Write bit, it resets back to state A2.
If the state-machine receives the ARA and a Read bit and if the Interrupt is LOW, then it goes to state I.
If the state-machine receives the ARA and a Read bit and if the Interrupt is HIGH, then it resets back to state A2.
If the state-machine receives the ARA and a Write bit and if the Interrupt is LOW, then it resets back to state A2.
If the state-machine receives the ARA and a Write bit and if the Interrupt is HIGH, then it resets back to state A2.
If the state-machine receives the DIA with a Write bit then it resets back to state A2.
If the state-machine receives anything other than the SA or the ACA or the ARA or the DIA, it resets back to state A2.
If the state-machine is none of the above, it stays in state B2, and receives the slave address.

State I:
In this state the state machine sends out an ACKNOWLEDGE and loads the shift register with its own address to be sent out.
The state machine goes to state D1 on the next SCL clock.

State D1:
This state has been added only to be able to encode all state transitions with a Gray code.
The first bit of the slave address is sent out in this state.
If the slave busy signal is detected here, the state machine resets back to state A2.
The state machine goes to state D4 on the next SCL clock.

State D4:

In this state, the state machine sends out the six remaining bits of the slave address along with the R/W# bit.

If the slave busy signal is detected here, the state machine resets back to state A2.

After sending out all 8 bits, the state machine goes to state K.

State K:

This state, in conjunction with the a state from "dia_ara_sm" generates control signals to identify the end of the alert response address protocol.

The state machine resets back to state A2 on the next SCL clock.

State C:

In this state, the state machine sends out an ACKNOWLEDGE and loads data to be read out into the shift register.

The state machine goes to state D2 on the next SCL clock.

State D2:

In this state, the state machine sends out the data onto the data line. It sends out a total of 8 bits.

The state machine goes back to state C after 8 clock cycles and if it receives an ACKNOWLEDGE after the 8th clock cycle.

If the state machine receives a NO ACKNOWLEDGE after the 8th clock cycle, the state machine resets back to state A2.

If the state machine detects the slave busy signal, it resets back to state A2.

State J:

In this state, the state machine sends out an ACKNOWLEDGE and loads the shift register with the device ID byte.

The state machine goes to state D3 on the next SCL clock.

State D3:

In this state, the state machine sends out the data onto the data line. It sends out a total of 8 bits.

The state machine goes back to state J after 8 clock cycles and if it receives an ACKNOWLEDGE after the 8th clock cycle.

If the state machine receives a NO ACKNOWLEDGE after the 8th clock cycle, the state machine resets back to state A2.

If the state machine detects the slave busy signal, it resets back to state A2.

Figure 4:
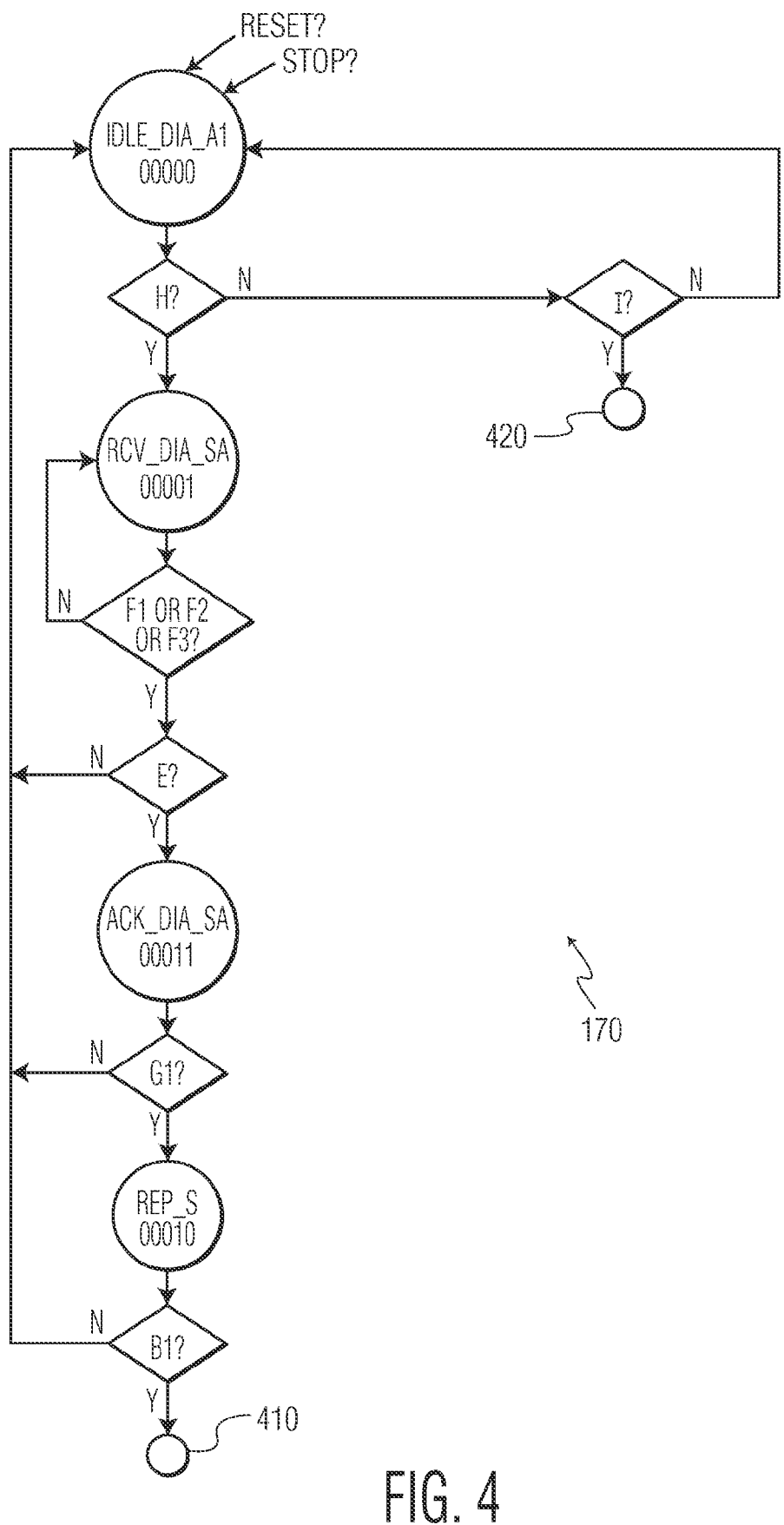
FIGS. 4 through 7 illustrate a flow chart of a method for data communications implementing enhanced slave/master interfacing on an I2C bus using state machines in accordance with embodiments of the present invention.
Figure 5:
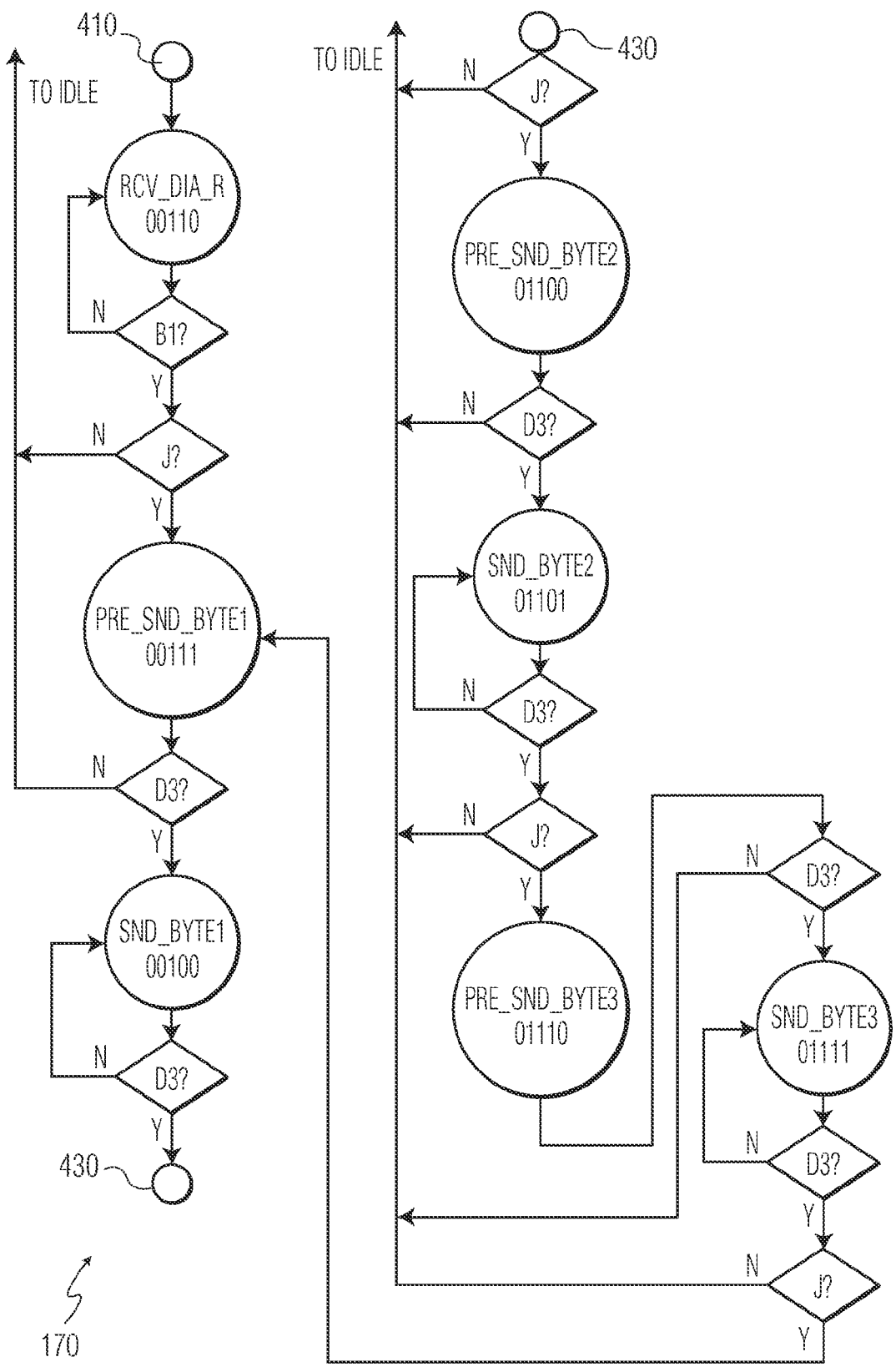
Figure 6:
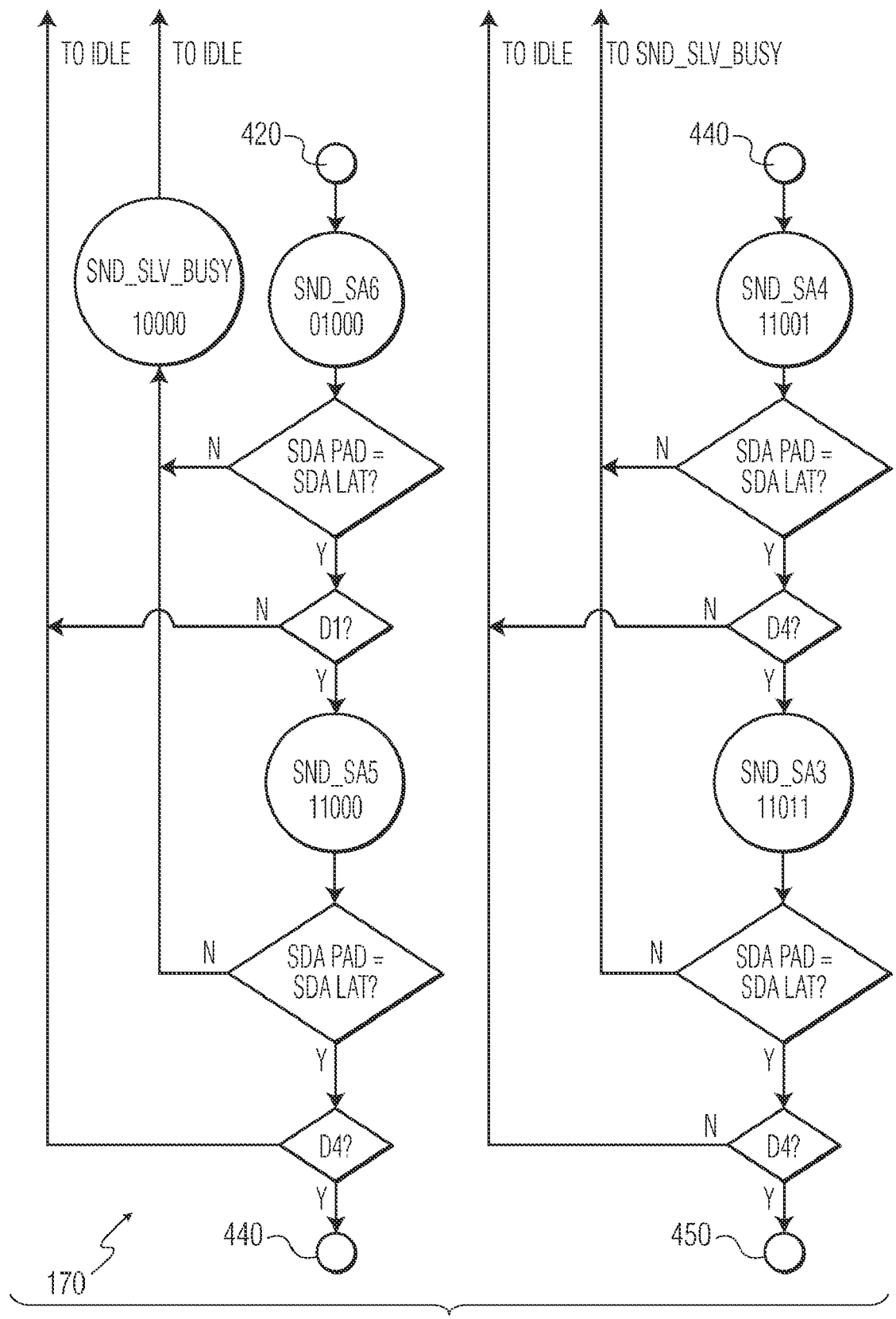
Figure 7:
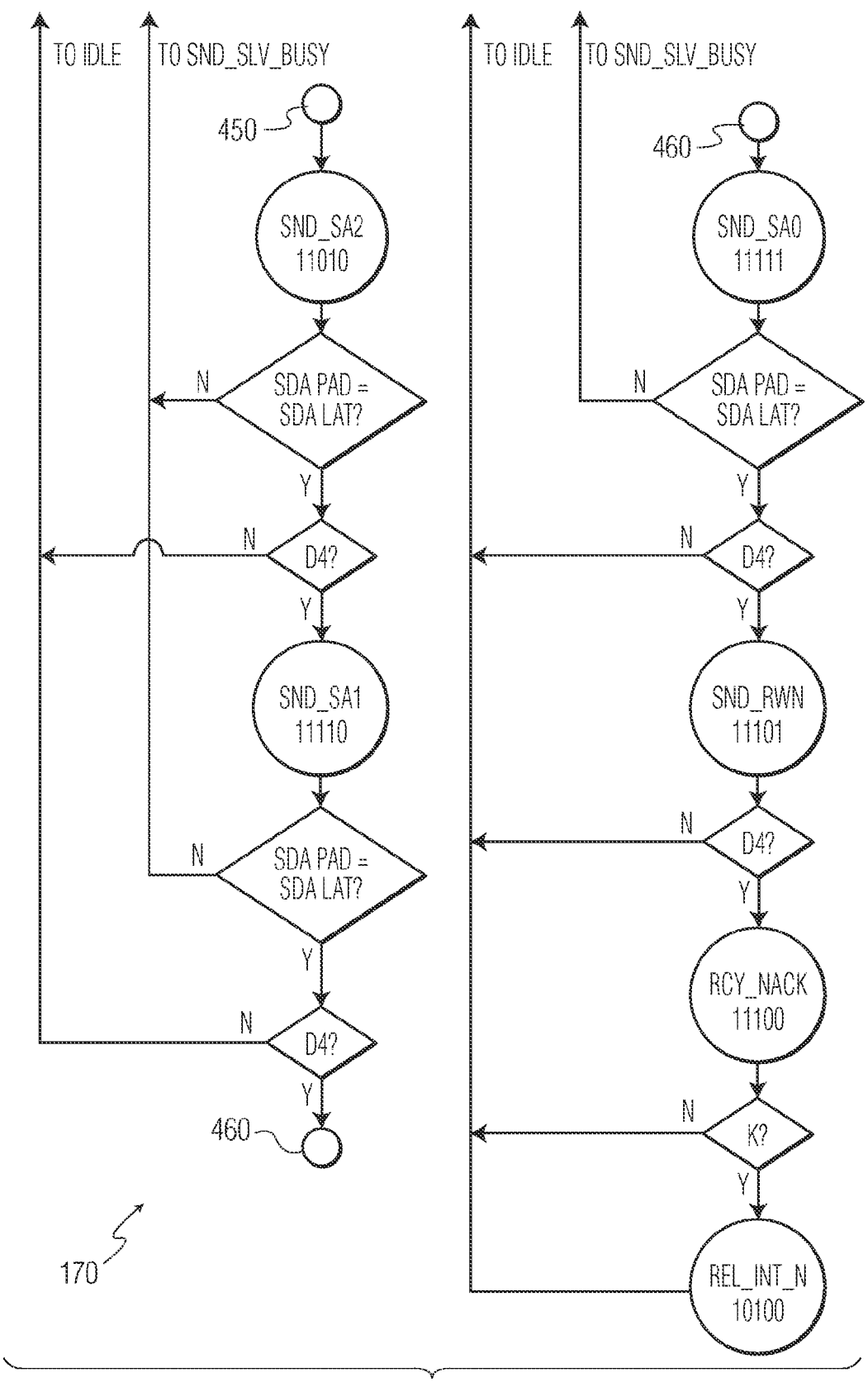

FIGS. 4 through 7 illustrate a state diagram for the background state machine 170, designated DIA_ARA_SM. In FIG. 4, a connector 410 is illustrated as a graphical annotation, designating a connection between the diagram of FIG. 4 and the connector 410 illustrated in FIG. 5. In FIG. 4, a connector 420 is illustrated as a graphical annotation, designating a connection between the diagram of FIG. 4 and the connector 420 illustrated in FIG. 6. In FIG. 5, a connector 430 is illustrated as a graphical annotation at both the bottom left and top right of FIG. 5, designating a connection between the bottom left and top right of the flow diagram illustrated in FIG. 5. In FIG. 6, a connector 440 is illustrated as a graphical annotation at both the bottom left and top right of FIG. 6, designating a connection between the bottom left and top right of the flow diagram illustrated in FIG. 6. In FIG. 6, a connector 450 is illustrated as a graphical annotation, designating a connection between the diagram of FIG. 6 and the connector 450 illustrated in FIG. 7. In FIG. 7, a connector 460 is illustrated as a graphical annotation at both the bottom left and top right of FIG. 7, designating a connection between the bottom left and top right of the flow diagram illustrated in FIG. 7. Following is a description of the states:

State IDLE_DIA_ARA:

The state machine enters this state, asynchronously, upon a RESET condition or a STOP condition, both active low.

If the state-machine detects that the I2CSM-W is in state H, it goes to state RCV_DIA_SA.

Otherwise if the state-machine detects that the I2CSM-R is in state I, it goes to state SND_SA6.

Otherwise the state-machine stays in state IDLE_DIA_ARA.

State RCV_DIA_SA:

The state machine stays in this state till it detects that I2CSM-W is in either of states F1, F2 or F3.

Otherwise when the state-machine detects that I2CSM-W is in state E, it goes to state ACK_DIA_SA.

Otherwise the state-machine goes back to IDLE_DIA_ARA.

State ACK_DIA_SA:

In this state, if I2CSM-W is in G1, the state-machine goes to state REP_S.

Otherwise the state-machine goes back to state IDLE_DIA_ARA.

State REP_S:

In this state, if I2CSM-W is in B1, the state-machine goes to state RCV_DIA_R.

Otherwise the state-machine goes back to state IDLE_DIA_ARA.

State RCV_DIA_R:

As long as I2CSM-W is in state B1, the state machine stays in this current state.

Otherwise, if I2CSM-R is in state J, this state machine goes to state PRE_SND_BYTE1.

Otherwise, the state-machine goes back to state IDLE_DIA_ARA.

State PRE_SND_BYTE1:

In this state, a control signal is generated to load DEVICE ID BYTE1 to be sent out on the I2C bus.

In this state, if I2CSM-R is in state D3, the state-machine goes to state SND_BYTE1.

Otherwise, the state-machine goes back to state IDLE_DIA_ARA.

State SND_BYTE1:

As long as I2CSM-R is in state D3, the state machine stays in this current state.

Otherwise if I2CSM-R is in state J, the state-machine goes to state PRE_SND_BYTE2.

Otherwise, the state-machine goes back to state IDLE_DIA_ARA.

State PRE_SND_BYTE2:

In this state, a control signal is generated to load DEVICE ID BYTE2 to be sent out on the I2C bus.

In this state, if I2CSM-R is in state D3, the state-machine goes to state SND_BYTE2.

Otherwise, the state-machine goes back to state IDLE_DIA_ARA.

State SND_BYTE2:

As long as I2CSM-R is in state D3, the state machine stays in this current state.

Otherwise if I2CSM-R is in state J, the state-machine goes to state PRE_SND_BYTE3.

Otherwise, the state-machine goes back to state IDLE_DIA_ARA.

State PRE_SND_BYTE3:

In this state, a control signal is generated to load DEVICE ID BYTE3 to be sent out on the I2C bus.

In this state, if I2CSM-R is in state D3, the state-machine goes to state SND_BYTE3.

Otherwise, the state-machine goes back to state IDLE_DIA_ARA.

State SND_BYTE3:

As long as I2CSM-R is in state D3, the state machine stays in this current state.

Otherwise if I2CSM-R is in state J, the state-machine goes to state PRE_SND_BYTE1.

Otherwise, the state-machine goes back to state IDLE_DIA_ARA.

State SND_SA6:

This state is used to check if the 6th bit of the slave address was sent out on the I2C bus, successfully.

If I2CSM-R is in state D1, then this state machine goes to state SND_SA5.

Otherwise the state machine goes back to state IDLE_DIA_ARA.

State SND_SA5:

This state is used to check if the 5th bit of the slave address was sent out on the I2C bus, successfully.

If I2CSM-R is in state D4, then this state machine goes to state SND_SA4.

Otherwise the state machine goes back to state IDLE_DIA_ARA.

State SND_SA4:

This state is used to check if the 4th bit of the slave address was sent out on the I2C bus, successfully.

If I2CSM-R is in state D4, then this state machine goes to state SND_SA3.

Otherwise the state machine goes back to state IDLE_DIA_ARA.

State SND_SA3:

This state is used to check if the 3rd bit of the slave address was sent out on the I2C bus, successfully.

If I2CSM-R is in state D4, then this state machine goes to state SND_SA2.

Otherwise the state machine goes back to state IDLE_DIA_ARA.

State SND_SA2:

This state is used to check if the 2nd bit of the slave address was sent out on the I2C bus, successfully.

If I2CSM-R is in state D4, then this state machine goes to state SND_SA1.

Otherwise the state machine goes back to state IDLE_DIA_ARA.

State SND_SA1:

This state is used to check if the 1st bit of the slave address was sent out on the I2C bus, successfully.

If I2CSM-R is in state D4, then this state machine goes to state SND_SA0.

Otherwise the state machine goes back to state IDLE_DIA_ARA.

State SND_SA0:

This state is used to check if the 0th bit of the slave address was sent out on the I2C bus, successfully.

If I2CSM-R is in state D4, then this state machine goes to state SND_RWN.

Otherwise the state machine goes back to state IDLE_DIA_ARA.

State SND_RWN:

This state is used to check if the R/W# bit of the slave address was sent out on the I2C bus, successfully.

If I2CSM-R is in state D4, then this state machine goes to state RCV_NACK.

Otherwise the state machine goes back to state IDLE_DIA_ARA.

State RCV_NACK:

If I2CSM-R is in state K, then this state machine goes to state REL_INT_N.

Otherwise the state machine goes back to state IDLE_DIA_ARA.

State REL_INT_N:

The state machine goes back to state IDLE_DIA_ARA.

Figure 8:
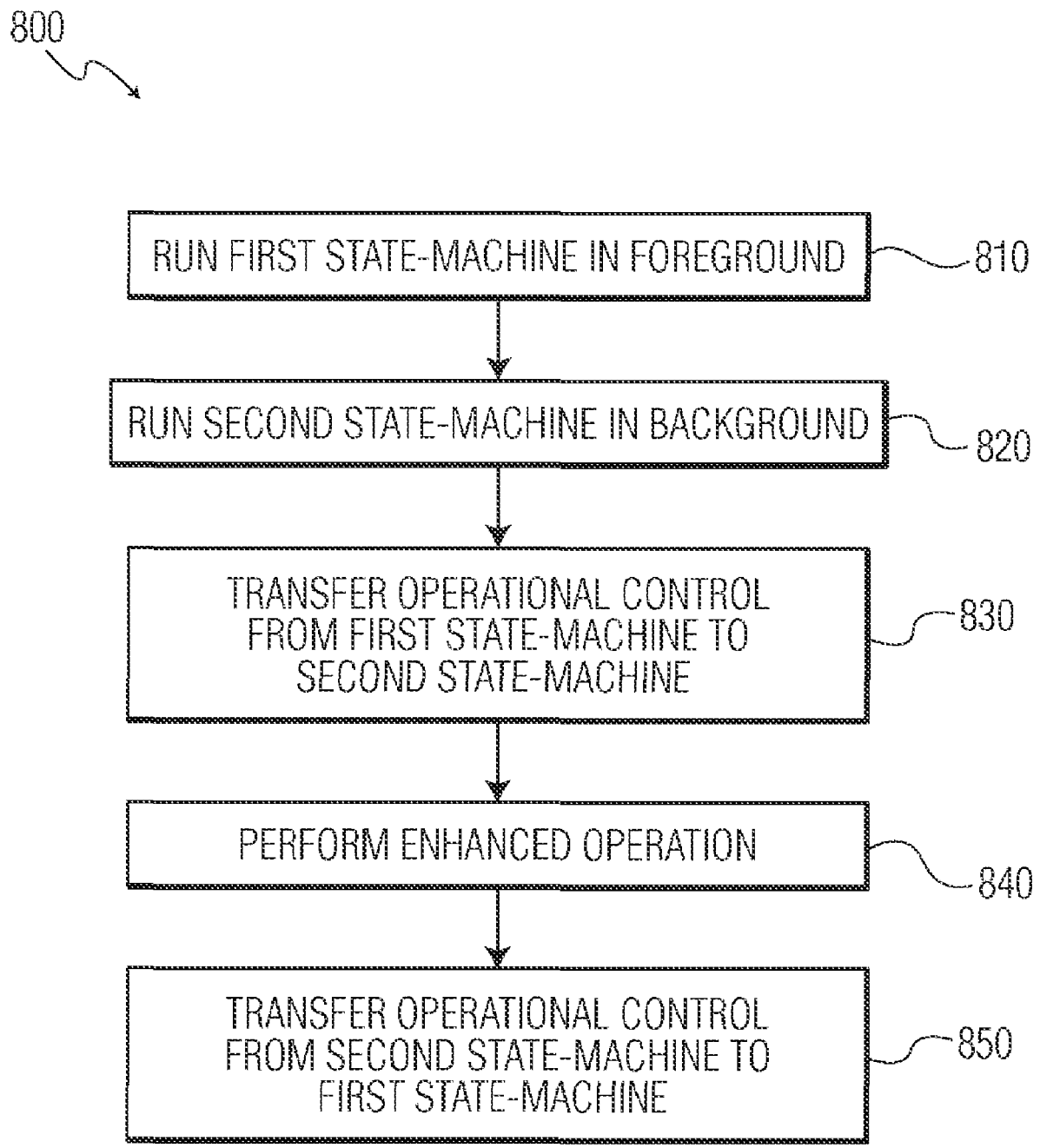
FIG. 8 is a flow chart of another method for enhancing slave/master interfacing on an I2C bus using state machines in accordance with other embodiments of the present invention.

FIG. 8 is a flow chart of a method 800 for enhanced slave/master interfacing on an I2C bus using state machines in accordance with other embodiments of the present invention. The method 800 involves running 810 a first state-machine in the foreground of an I2C slave device, and running 820 a second state-machine in the background. Operational control of the slave device is transferred 830 from the first state-machine to the second state-machine in order to implement a feature of the slave device. The feature, for example an enhanced operation 840, is performed, and operational control is subsequently transferred back 850 to the first state-machine. The term first state-machine, with respect to FIG. 8, may encompass a monolithic embodiment of the first and second state-machines illustrated in FIGS. 1 through 3.

Enhanced features, such as ALL CALL and Device ID are further described in commonly owned co-pending U.S. Patent Application Nos. 60/676,164; and 60/676,104, which are hereby incorporated herein by reference.

Hardware, firmware, software or a combination thereof may be used to perform the various embodiments for enhancing slave/master interfacing on an I2C bus using state machines as described herein. The master device functionality used in connection with the invention may reside in an I2C master device as described, or may alternatively reside on a stand-alone or networked computer attached to the serial data communications system 100. The serial data communications system 100 illustrated in FIG. 1 is an example structure that can be used in connection with such communications systems, computers, or other computer-implemented devices to carry out operations of the present invention.

The example master device 130 illustrated in FIG. 1, suitable for controlling the I2C communications on the I2C bus in accordance with the present invention, typically includes a central processor (CPU) coupled to random access memory (RAM) and/or some variation of read-only memory (ROM). The ROM may also be other types of storage media to store programs, such as programmable ROM (PROM), erasable PROM (EPROM), etc. The processor may communicate with other internal and external components through input/output (I/O) circuitry and/or other bussing, to provide control signals, communication signals, and the like.

The master device 130 may also include one or more data storage devices, including hard and floppy disk drives, CD-ROM drives, and other hardware capable of reading and/or storing information, such as DVD, etc. In one embodiment, software for enhancing slave/master interfacing on an I2C bus using state machines may be stored and distributed on a CD-ROM, diskette, or other form of media capable of portably storing information. These storage media may be inserted into, and read by, devices such as a CD-ROM drive, the disk drive, etc. The software may also be transmitted to the computing arrangement via data signals, such as being downloaded electronically via a network, such as the Internet. Further, as previously described, the software for carrying out the functions associated with the present invention may alternatively be stored in internal memory/storage of the computing device, such as in the ROM.

Any resulting program(s), having computer-readable program code, may be embodied within one or more computer-usable media such as memory devices or transmitting devices, thereby making a computer program product or article of manufacture according to the invention. As such, the terms "computer readable medium," "article of manufacture," "computer program product" or other similar language as used herein are intended to encompass a computer program which exists permanently, temporarily, or transitorily on any computer-usable medium such as on any memory device or in any transmitting device.

Each feature disclosed in this specification (including any accompanying claims, abstract, and drawings), is replacable by alternative features having the same, equivalent or similar purpose, unless expressly stated otherwise. Thus, unless expressly stated otherwise, each feature disclosed is one example only of a generic series of equivalent or similar features.

The present invention should not be considered limited to the particular examples described above. Various modifications, equivalent processes, as well as numerous structures to which the present invention may be applicable fall within the scope of the present invention. For example, embodiments for enhanced slave/master interfacing on an I2C bus using state machines in accordance with the present invention can be implemented using a similarly constructed one-way or two-way interface for communication between devices on a common bus, such as an SMBus or other bus arrangement. Such variations may be considered as part of the claimed invention, as fairly set forth in the appended claims.

What is claimed is:

1. A data communications system, comprising:
an I2C serial data transfer bus comprising:
for implementing a communications protocol, a clock line providing a clock signal having cyclically repeating rising edges and falling edges; and
a serial data line; and
a slave device, comprising:
a first and second state-machine responsive to the rising edge of the clock signal; and
a third state-machine, distinctly operational from the first and second state-machine, responsive to the falling edge of the clock signal;
wherein one of the first state-machine and the second state-machine conform to write states of the communications protocol, and the other of the first state-machine and the second state-machine conform to read states of the communications protocol.

2. The data communications system of claim 1, wherein the first and second state-machines reset asynchronously on an I2C STOP condition or an I2C RESET or a START condition.

3. The data communications system of claim 1, wherein the first and second state-machine transfer operational control of the slave device to the third state-machine under pre-determined conditions.

4. The data communications system of claim 1, wherein the first and second state-machine runs in the foreground, assuming operational control of the slave device until transferring operational control of the slave device to the third state-machine.

5. The data communications system of claim 4, wherein the third state-machine is configured to implement a slave device identification protocol in response to a device identification request by a master device when the third state-machine has operational control of the slave device.

6. The data communications system of claim 4, wherein the third state-machine is configured to implement a loading of data, in parallel with other slave devices, in response to an ALL CALL request by a master device when the third state-machine has operational control of the slave device.

7. The data communications system of claim 4, wherein the third state-machine is configured to implement an alert protocol in response to an SMBus Alert request by a master device when the third state-machine has operational control of the slave device.

8. In a communications system using an I2C serial data transfer bus that has a serial data line and a clock line used to implement a communications protocol, a method for a slave device to interface with a master device, the method comprising:
running a first and second state-machine in the slave device responsive to the rising edge of a clock signal provided on the clock line of the I2C serial data transfer bus; and
running a third state-machine in the slave device, distinctly operational from the first and second state-machine, responsive to the falling edge of the clock signal;
wherein one of the first and second state-machine conform to write states of the communications protocol, and the other of the first and second state-machine conform to read states of the communications protocol.

9. The method of claim 8, comprising resetting the first and third state-machines asynchronously on an I2C STOP condition or an I2C RESET condition or an I2C START condition.

10. The method of claim 8, comprising transferring operational control of the slave device from the first and second state-machine to the third state-machine under pre-determined conditions.

11. The method of claim 10, wherein running the third state-machine comprises implementing a slave device identification protocol in response to a device identification request by a master device when the third state-machine has operational control of the slave device.

12. The method of claim 10, wherein running the third state-machine comprises implementing a loading of data, in parallel with other slave devices, in response to an ALL CALL request by a master device when the third state-machine has operational control of the slave device.

13. The method of claim 10, wherein running the third state-machine comprises implementing an alert protocol in response to an SMBus Alert request by a master device when the third state-machine has operational control of the slave device.

14. The method of claim 8, wherein running the first and second state-machine in the slave device comprises running the first and second state-machine in the foreground, thereby assuming operational control of the slave device until transferring operational control of the slave device to the third state-machine.

15. A data communications system, comprising:
means for running a first and second state-machine in the slave device responsive to the rising edge of a clock signal provided on the clock line of the I2C serial data transfer bus; and
means for running a third state-machine in the slave device, distinctly operational from the first and second state-machine, responsive to the falling edge of the clock signal;
wherein one of the first and second state-machine and the third state-machine conform to write states of the communications protocol, and the other of the first and second state-machine and the third state-machine conform to read states of the communications protocol.

16. The system of claim 15, comprising means for transferring operational control of the slave device from the first and second state-machine to the third state-machine under pre-determined conditions.

17. The system of claim 15, comprising means for gating the clock signal, wherein the first and second state-machine comprises an idle state such that the gated clock signal is not received by the first and second state-machine when the first and second state-machine are in their idle state.

18. The system of claim 15, comprising means for gating the clock signal, wherein the third state-machine comprises an idle state such that the gated clock signal is not received by the third state-machine when the third state-machine is in its idle state.

19. The system of claim 15, comprising means for implementing a slave device identification protocol in response to a device identification request by a master device.

20. The system of claim 15, comprising means for implementing a loading of data, in parallel with other slave devices, in response to an ALL CALL request by a master device.

* * * * *